United States Patent
Yoshie et al.

(10) Patent No.: US 9,101,828 B2
(45) Date of Patent: Aug. 11, 2015

(54) NON-TRANSITORY COMPUTER-READABLE STORAGE MEDIUM STORING GAME PROGRAM, AND GAME SYSTEM

(71) Applicant: DeNA Co., Ltd., Tokyo (JP)

(72) Inventors: Naoto Yoshie, Tokyo (JP); Yoshiro Kitazawa, Tokyo (JP); Toshinori Suzuki, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/283,064

(22) Filed: May 20, 2014

(65) Prior Publication Data

US 2014/0248947 A1 Sep. 4, 2014

Related U.S. Application Data

(63) Continuation of application No. 13/734,626, filed on Jan. 4, 2013, now Pat. No. 8,764,570.

(30) Foreign Application Priority Data

Apr. 27, 2012 (JP) .................................. 2012-103508

(51) Int. Cl.
*A63F 13/00* (2014.01)
*A63F 13/30* (2014.01)
*A63F 13/847* (2014.01)
*A63F 13/48* (2014.01)
*A63F 13/46* (2014.01)
*A63F 13/822* (2014.01)
*A63F 13/335* (2014.01)

(52) U.S. Cl.
CPC ............... *A63F 13/00* (2013.01); *A63F 13/12* (2013.01); *A63F 13/335* (2014.09); *A63F 13/46* (2014.09); *A63F 13/48* (2014.09); *A63F 13/822* (2014.09); *A63F 13/847* (2014.09)

(58) Field of Classification Search
CPC ............ G07F 17/3225; G07F 17/3237; G07F 17/3272; G07F 17/3274; G07F 17/3276
USPC .................................................. 463/9, 30, 42
See application file for complete search history.

(56) References Cited

U.S. PATENT DOCUMENTS

| | | |
|---|---|---|
| 2004/0143852 A1 | 7/2004 | Meyers |
| 2008/0146338 A1 | 6/2008 | Bernard et al. |
| 2010/0287065 A1 | 11/2010 | Alivandi |
| 2013/0116052 A1 | 5/2013 | Okada et al. |

FOREIGN PATENT DOCUMENTS

JP  2007061253 A  3/2007

*Primary Examiner* — James S McClellan

(74) *Attorney, Agent, or Firm* — Rothwell, Figg, Ernst & Manbeck, P.C.

(57) ABSTRACT

A non-transitory computer-readable storage medium storing a game program that causes a computer to execute the following processes: a reception process; a battle process; and a notification process. The reception process is for receiving a first operational input from a first player and a second operational input from a second player who is associated with the first player. The battle process is as follows: a battle between the first player and an opposing character starts based on the first operational input; a hit point parameter of the opposing character changes through the battle; an outcome of the battle is determined; a battle between the second player and the opposing character starts The notification process is for, before the outcome of the battle with the opposing character is determined in the battle process, notifying participation information to a third player.

5 Claims, 10 Drawing Sheets

| CARD ID | CHARACTER NAME | LEVEL | ATTACK POWER | DEFENSE POWER | HIT POINT |
|---|---|---|---|---|---|
| 0001 | WARRIOR A | LV.5 | 500 | 500 | 1000 |
| ⋮ | ⋮ | ⋮ | ⋮ | ⋮ | ⋮ |
| 0100 | WIZARD X | LV.15 | 2000 | 2000 | 8000 |
| ⋮ | ⋮ | ⋮ | ⋮ | ⋮ | ⋮ |
| 0105 | MARTIAL ARTIST Y | LV.16 | 1000 | 1000 | 6000 |
| ⋮ | ⋮ | ⋮ | ⋮ | ⋮ | ⋮ |

FIG. 4

| RECOVERY ITEM ID | RECOVERY ITEM NAME | PRICE | RECOVERY VALUE |
|---|---|---|---|
| 001 | RECOVERY ITEM NAME A | 30 | 1 |
| 002 | RECOVERY ITEM NAME B | 40 | 2 |
| 003 | RECOVERY ITEM NAME C | 50 | 3 |
| ⋮ | ⋮ | ⋮ | ⋮ |

FIG. 5

| USER ID | FRIEND USER ID | VIRTUAL CURRENCY | BATTLE ENERGY | OWNED CARD INFORMATION | OWNED RECOVERY ITEM ID | ACCUMULATED DAMAGE | OPPOSING CHARACTER APPEARANCE INFORMATION |
|---|---|---|---|---|---|---|---|
| 1 | 5, 8 | 0 | 3 | OWNED CARD INFORMATION(1) | OWNED RECOVERY ITEM ID(1) | 1500 | FALSE |
| 2 | NONE | 500 | 5 | OWNED CARD INFORMATION(2) | OWNED RECOVERY ITEM ID(2) | 600 | FALSE |
| 3 | 4, 6 | 700 | 10 | OWNED CARD INFORMATION(3) | OWNED RECOVERY ITEM ID(3) | 500 | FALSE |
| 4 | 3, 6 | 1000 | 3 | OWNED CARD INFORMATION(4) | OWNED RECOVERY ITEM ID(4) | 900 | TRUE |
| 5 | 1, 6 | 100 | 5 | OWNED CARD INFORMATION(5) | OWNED RECOVERY ITEM ID(5) | 400 | FALSE |
| 6 | 3, 4, 5 | 3000 | 10 | OWNED CARD INFORMATION(6) | OWNED RECOVERY ITEM ID(6) | 300 | TRUE |
| . | . | . | . | . | . | . | . |
| . | . | . | . | . | . | . | . |
| . | . | . | . | . | . | . | . |

FIG. 6

| OWNED CARD INFORMATION(3) | | | | | |
| OWNED CARD INFORMATION(2) | | | | | |
| OWNED CARD INFORMATION(1) | | | | | |
| OWNED CARD ID | LEVEL | ATTACK POWER | DEFENSE POWER | HIT POINT | ACQUISITION DATE/TIME |
| 0011 | LV. 3 | 15 | 10 | 200 | 2012/2/13 10:00 0:00 0:00 0:00 |
| 0211 | LV. 4 | 20 | 23 | 150 | 2012/2/13 12:00 2:00 2:00 2:00 |
| 0133 | LV. 1 | 70 | 45 | 100 | 2012/2/14 11:30 1:30 1:30 |
| 0201 | LV. 4 | 22 | 40 | 600 | 2012/2/15 18:00 8:00 8:00 |
| 0072 | LV. 7 | 60 | 50 | 250 | 2012/2/16 13:30 3:30 3:30 |
| 0094 | LV. 1 | 300 | 200 | 450 | 2012/2/16 19:00 9:00 |
| . | . | . | . | . | . |
| . | . | . | . | . | . |
| . | . | . | . | . | . |

FIG. 7

| OWNED RECOVERY ITEM INFORMATION (1) | | |
|---|---|---|
| ITEM ID | NUMBER OF OWNED ITEM | RECOVERY VALUE |
| 001 | 3 | 1 |
| 025 | 1 | 3 |
| 030 | 5 | 10 |
| . | . | . |
| . | . | . |

(Stacked: OWNED RECOVERY ITEM INFORMATION (2), OWNED RECOVERY ITEM INFORMATION (3))

FIG. 8

| OPPOSING CHARACTER ID | OPPOSING CHARACTER NAME | LEVEL | ATTACK POWER | DEFENSE POWER | LIFE (HP) | APPEARANCE TIME PERIOD |
|---|---|---|---|---|---|---|
| 001 | BOSS A | 15 | 5000 | 4500 | 10000 | 60 min. |
| ⋮ | ⋮ | ⋮ | ⋮ | ⋮ | ⋮ | ⋮ |

FIG. 9

NON-TRANSITORY COMPUTER-READABLE STORAGE MEDIUM STORING GAME PROGRAM, AND GAME SYSTEM

CROSS-REFERENCE TO RELATED APPLICATIONS

This application is a continuation of U.S. application Ser. No. 13/734,626, filed Jan. 4, 2013, which claims priority upon Japanese Patent Application No. 2012-103508 filed on Apr. 27, 2012. The disclosures of each of the above-referenced applications are herein incorporated by reference in their entirety.

BACKGROUND

1. Technical Field

This invention relates to a non-transitory computer-readable storage medium storing a game program, and a game system.

2. Related Art

A game program is known that causes a computer to execute a battle game in which an operational input is received from a player and in which, based on the operational input, a player battles with an opposing character (an adversary) and an outcome is determined (for example, Japanese Laid-Open Patent Publication No. 2007-61253).

With such a game program, there are cases where it is difficult to defeat an opposing character if the number of players is small. In these cases, it is preferable to have a larger number of players participate in a battle with the opposing character.

SUMMARY

The present invention has been conceived in view of the above issue, and an object thereof is to have a larger number of players participate in a battle with an opposing character.

An aspect of the invention to solve the above problem is a non-transitory computer-readable storage medium storing a game program that causes a computer to perform the following processes:
 a reception process to receive
  a first operational input from a first player and
  a second operational input from a second player who is associated with the first player;
 a battle process in which
  a battle between the first player and an opposing character starts based on the first operational input,
  a hit point parameter indicative of an amount of damage that the opposing character can withstand changes through the battle,
  an outcome of the battle between the first player and an opposing character is determined,
  a battle between the second player and the opposing character starts based on the second operational input,
  the hit point parameter of the opposing character further changes through the battle, and
  an outcome of the battle between the second player and the opposing character is determined; and
 a notification process to, before the outcome of the battle with the opposing character is determined in the battle process, notify participation information to a third player who is not associated with the first player and is associated with the second player, the participation information indicating that the third player can participate in the battle with the opposing character.

Other features of this invention will become apparent from the description in this specification and the attached drawings.

BRIEF DESCRIPTION OF DRAWINGS

FIG. 4 illustrates an example of a data structure of card information.
FIG. 5 illustrates an example of a data structure of recovery item information.
FIG. 6 illustrates an example of a data structure of user information.
FIG. 7 illustrates an example of a data structure of owned card information.
FIG. 8 illustrates an example of a data structure of owned recovery item information.
FIG. 9 illustrates an example of a data structure of opposing character information.

DESCRIPTION OF EMBODIMENTS

Figure 1:
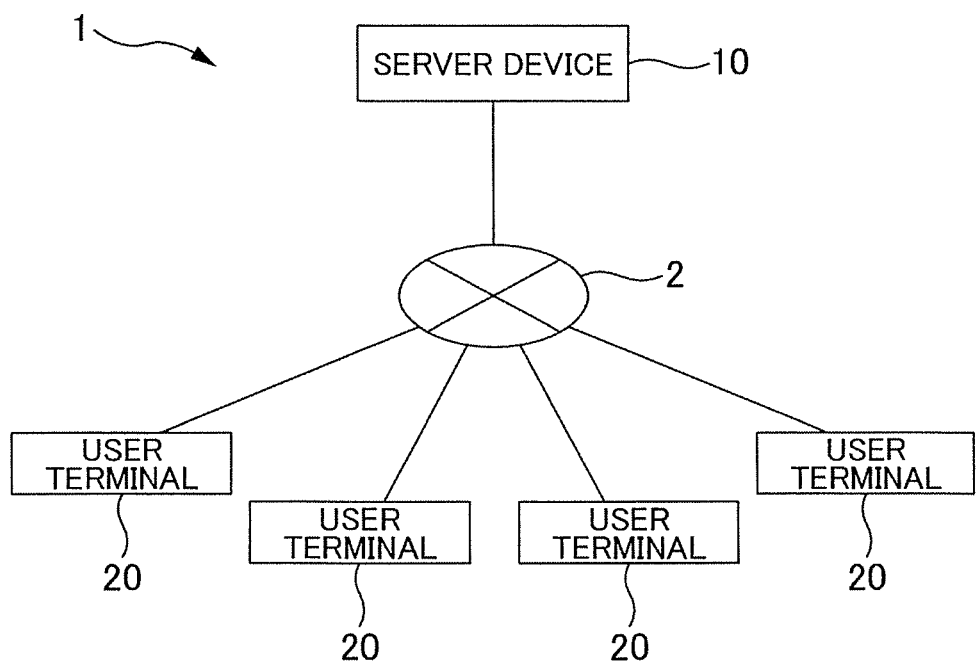
FIG. 1 is an example of an overall configuration of a game system 1 according to the present embodiment.

With the description and the accompanied drawings, at least the following matters will be apparent.

A non-transitory computer-readable storage medium storing a game program that causes a computer to perform the following processes:
 a reception process to receive
  a first operational input from a first player and
  a second operational input from a second player who is associated with the first player;
 a battle process in which
  a battle between the first player and an opposing character starts based on the first operational input,
  a hit point parameter indicative of an amount of damage that the opposing character can withstand changes through the battle,
  an outcome of the battle between the first player and an opposing character is determined,
  a battle between the second player and the opposing character starts based on the second operational input,
  the hit point parameter of the opposing character further changes through the battle, and
  an outcome of the battle between the second player and the opposing character is determined; and
 a notification process to, before the outcome of the battle with the opposing character is determined in the battle process, notify participation information to a third player who is not associated with the first player and is associated with the second player, the participation information indicating that the third player can participate in the battle with the opposing character.

Such a game program can make a larger number of players participate in a battle with an opposing character.

In such a game program, it is acceptable that
when a third operational input from the third player is received in the reception process within a limited time period that has been set in advance for the opposing character,
the game program causes the computer to execute the battle process between the third player and the opposing character, and
when the third operational input from the third player is received in the reception process after the limited time period has elapsed,
the game program does not cause the computer to execute the battle process between the third player and the opposing character.

Such a game program can make the third player actively participate in the battle because a participation time period is limited.

In such a game program, it is acceptable that
the battle process is a process for starting a battle with the opposing character by causing consumption of a consumption parameter set for each player,
the game program causes the computer to selectively execute
a first recovery process in which the consumption parameter of each player recovers using a recovery item by which the consumption parameter of each player recovers, and
a second recovery process in which the consumption parameter of each player recovers with time regardless of the use of the recovery item, and
the game program causes the computer to execute
an attack process in which a value of the hit point parameter of the opposing character reduces as a result of each player's attack that is performed on the opposing character after the recovery.

With such a game program, it is possible to enjoy a strategic play together with other players in a battle game in which players battle with a common opposing character.

In such a game program, it is acceptable that
when it has been determined in the battle process that the second player who has battled with the opposing character based on the second operational input from the second player is defeated,
the game program causes the computer to execute the notification process.

Such a game program can make the third player actively participate in the battle by notifying the defeat of the second player.

In such a game program, it is acceptable that
when it has been determined that the opposing character is defeated as a result of the battle,
the game program causes the computer to execute a reward process in which
a player who has secured the defeat of the opposing character is identified out of a plurality of players based on changes in the hit point parameter of the opposing character and
a special reward is given to the identified player.

Such a game program can make the third player actively participate in the battle by giving a special reward.

In such a game program, it is acceptable that
when it has been determined that the opposing character is defeated as a result of the battle,
the game program causes the computer to execute
a process to calculate for each player an accumulated value of the hit point parameter of the opposing character, the accumulated value being a value that are reduced as a result of attacks by each player, and
a process in which a special reward is given to a player who has the largest accumulated value.

Such a game program can make the third player actively participate in the battle by giving a special reward.

Further, A game system
that includes
a plurality of player terminals used by each of a plurality of players and
a server device connected to each player terminal over a network and
in which each player plays a battle game for battling with an opposing character,
each of the player terminals including:
an input unit with which a player performs an operational input; and
a transmission unit that transmits the operational input from the player to the server device over the network, and
the server device including:
a reception unit that receives a first operational input from a first player and a second operational input from a second player who is associated with the first player;
a battle processing unit that performs
a process in which
a battle between the first player and the opposing character starts based on the first operational input,
a hit point parameter indicative of an amount of damage that the opposing character can withstand change through the battle, and
an outcome of the battle with the opposing character is determined, and
a process in which
a battle between the second player and the opposing character starts based on the second operational input,
the hit point parameter of the opposing character further changes through the battle, and
an outcome of the battle with the opposing character is determined; and
a notification unit that, before the outcome of the battle with the opposing character is determined in the battle processing unit, notifies participation information to a third player who is not associated with the first player and is associated with the second player, the participation information indicating that the third player can participate in the battle with the opposing character.

Such a game program can make a larger number of players participate in a battle with an opposing character.

Present Embodiment

Configuration of Game System 1

FIG. 1 is an example of an overall configuration of a game system 1 according to the present embodiment. The game system 1 according to the present embodiment provides various types of services related to games to a user who has been registered as a member (also referred to as "player") over a network 2. The user can play a game transmitted over the network 2 by accessing the game system 1. The user can also register other users as friends on a friend list by accessing the game system 1. In this way, the game system 1 encourages communication between a plurality of users by allowing the users to play games and exchange messages with users who have become friends.

The game system 1 according to the present embodiment includes a server device 10 and a plurality of user terminals 20 (also referred to as "player terminals"). The server device 10 and the user terminals 20 are each connected to the network 2 and are able to communicate with each other. The network 2 is, for example, the Internet, a local area network (LAN), or a value added network (VAN) established by Ethernet (trademark) or a public switched telephone network, a radio communication network, or a mobile phone network.

The server device 10 is an information processing device used by a person such as a system administrator when managing and controlling the game service. The server device 10 is, for example, a workstation or personal computer and is able to distribute various types of information to the user terminals 20 in response to various commands (requests) transmitted from those user terminals 20. When a distribution request for game contents is received from a user terminal 20 used by a user playing a game, the server device 10 according to the present embodiment is able to distribute in accordance with the request the following game contents: a game program that is operable on the user terminal 20; a web page which is generated by a mark-up language (HTML and the like) suited to the standards of the user terminal; and the like.

The user terminal 20 is an information processing device used by a user when playing a game. The user terminal 20 may be, for example, a mobile telephone terminal, a smartphone, a personal computer, or a game device and the like. The user terminal 20 is able to send a distribution request for various types of information (e.g., game contents such as game programs and web pages) related to the game to the server device 10 that is accessible over the network 2. The user terminal 20 also has a web browser function for allowing users to view web pages. Therefore, when web pages (e.g., game play images) linked to, for example, image data related to a game are distributed from the server device 10, the user terminals 20 are able to display the web pages on screens.

Configuration of Server Device 10

Figure 2:
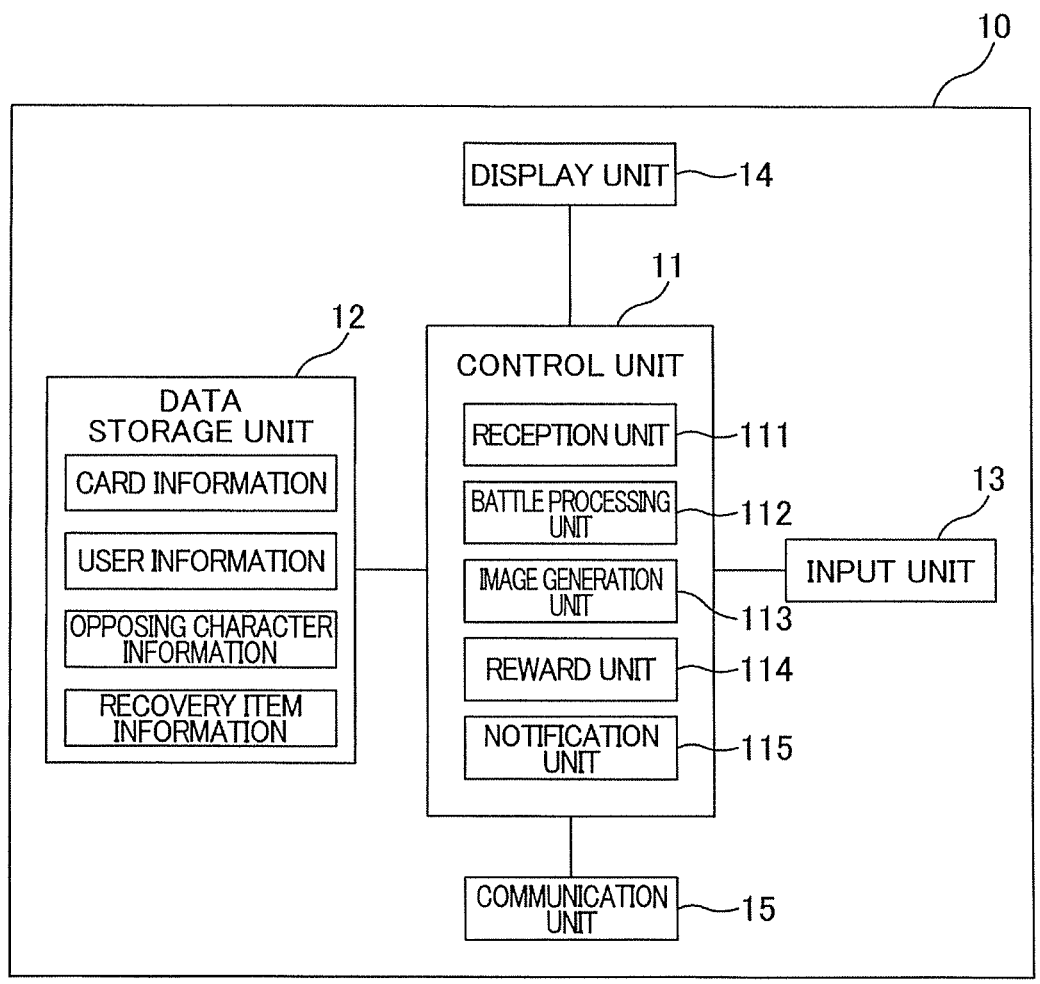
FIG. 2 is a block diagram of a functional configuration of a server device 10 according to the present embodiment.

FIG. 2 is a block diagram of a functional configuration of a server device 10. The server device 10 according to the present embodiment includes a control unit 11, a data storage unit 12, an input unit 13, a display unit 14, and a communication unit 15.

The control unit 11 is a unit that transfers data among the units and controls the entire server device 10, and is realized by a central processing unit (CPU) executing a program stored in a certain memory. Specifically, the control unit 11 has a function to execute various controls and information processes related to the game system 1 such as various processes to provide a game service and various processes to respond to requests from the user terminals 20. To be more specific, the control unit 11 according to the present embodiment includes a reception unit 111, a battle processing unit 112, an image generation unit 113, a reward unit 114, and a notification unit 115 as shown in FIG. 2.

The reception unit 111 has a function to perform a process for receiving operational inputs from players. Specifically, the reception unit 111 is able to receive operational inputs from players by the server device 10 receiving operational information (e.g., operational commands) which the players input with the user terminals 20 over a network.

The battle processing unit 112 has a function to perform a process for determining an outcome of a battle with an opposing character. The battle processing unit 112 also has the following functions: a function to perform a recovery process for increasing a value of a consumption parameter set for a player (a parameter consumed through a battle with an opposing character); a function to perform an attack process for reducing a value of a hit point parameter of the opposing character when the player attacks the opposing character; and the like.

The image generation unit 113 has a function to perform a process for generating various types of image data such as a task image that allows players to play a game and game images including an opposing character and the like. Screen transitions according to the present embodiment will be described later in detail.

The reward unit 114 has a function to perform a process for giving a reward to players who have satisfied a predetermined reward condition during a battle with an opposing character. Specifically, the reward unit 114 according to the present embodiment has a function to perform a process for giving a normal reward to players and a process for giving a special reward which is superior to the normal reward to players.

The notification unit 115 has a function as follows: when a predetermined notification condition has been satisfied during a battle with an opposing character, the notification unit 115 performs a process for notifying players of participation information indicating that the players can participate in the battle with the opposing character.

The data storage unit 12 has a read only memory (ROM) and a random access memory (RAM): the ROM is a read-only storage region in which system programs for the server device 10 are stored, and the RAM is a rewritable storage region in which various types of data (flags and computed values used by the system program) generated by the control unit 11 are stored and which is used as a work area for computing processes performed by the control unit 11. The data storage unit 12 is realized, for example, by a non-volatile storage device such as a flash memory or a hard disk and the like. The data storage unit 12 according to the present embodiment stores card information, user information, opposing character information, and recovery item information: the card information is information related to a game card used by a user in a game; the user information is information related to the user; the opposing character information is information related to an opposing character; and the recovery item information is related to recovery items. These pieces of information will be described later in detail.

The input unit 13 is a unit with which a system administrator, etc. input various types of data (e.g., the following card information, opposing character information and recovery item information), and is realized by a keyboard, a mouse, and the like.

The display unit 14 is a unit which displays operating screens for the system administrator according to commands from the control unit 11, and is realized, for example, by a liquid crystal display (LCD) and the like.

The communication unit 15 is a unit for performing communication with the user terminals 20, and has a function as a reception unit for receiving signals and various data transmitted from the user terminals 20, and a function as a transmission unit for transmitting the signals and various data to the user terminals 20 in accordance with commands from the control unit 11. The communication unit 15 is realized, for example, by a network interface card (NIC) and the like.

Configuration of User Terminal 20

Figure 3:
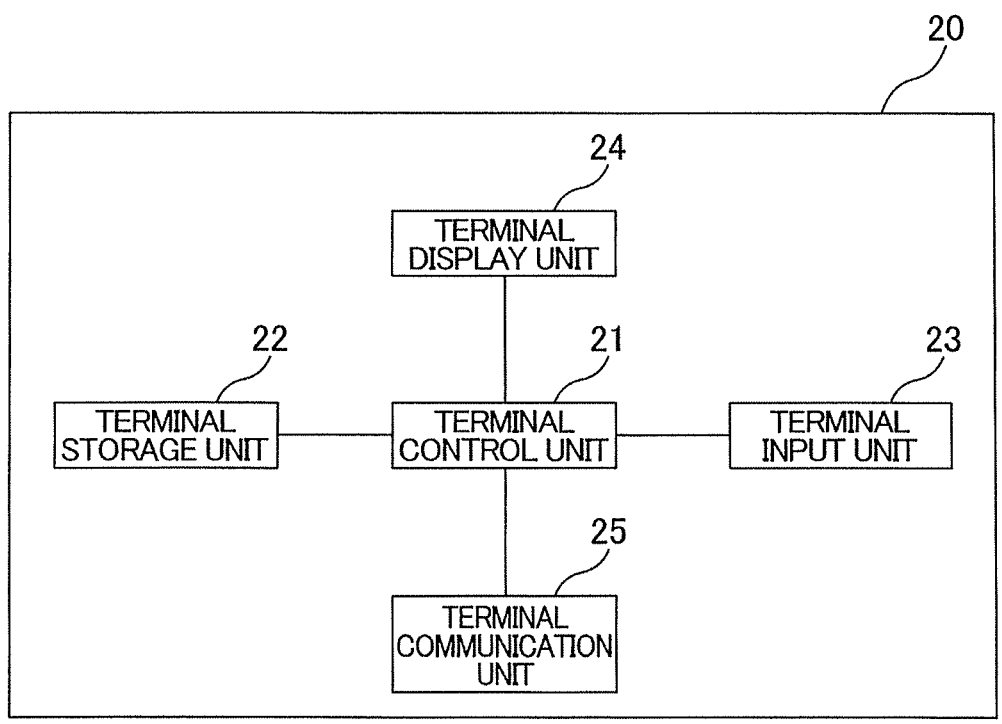
FIG. 3 is a block diagram of a functional configuration of a user terminal 20 according to the present embodiment.

FIG. 3 is a block diagram of a functional configuration of a user terminal 20. The user terminal 20 according to the present embodiment includes a terminal control unit 21, a terminal storage unit 22, a terminal input unit 23, a terminal display unit 24, and a terminal communication unit 25.

The terminal control unit 21 is a unit that transfers data among the units and controls the entire user terminal 20. The terminal control unit 21 is realized by a central processing unit (CPU) executing a program stored in a certain memory. Specifically, the terminal control unit 21 has a function to execute various controls and information processes related to the game system 1 such as various processes for accessing a game site, and various processes for sending requests to the server device 10.

The terminal storage unit 22 has a read only memory (ROM) a random access memory (RAM): the ROM is a read-only storage region in which system programs for the user terminal 20 are stored; and the RAM is a rewritable storage region in which various types of data (flags and computed values used by the system program) generated by the terminal control unit 21 are stored and which is used as a work area for computing processing by the terminal control unit 21. The terminal storage unit 22 is realized, for example, by a non-volatile storage device such as a flash memory or a hard disk and the like. The terminal storage unit 22 is connected to the terminal control unit 21 through a bus. In accordance with commands from the terminal control unit 21, the data stored in the terminal storage unit 22 is looked up, read, and rewritten. In the present embodiment, the terminal storage unit 22 records user IDs and the following game contents which are transmitted from the server device 10: game programs; game data; and the like.

The terminal input unit 23 is a unit with which the user performs various operations (game operations, text input operations, and the like), and is realized, for example, by an operating button, a touchscreen or the like.

The terminal display unit 24 is a unit for displaying a game screen (game play image) generated based on game information according to commands from the terminal control unit 21, and is realized, for example, by a liquid crystal display (LCD) and the like.

The terminal communication unit 25 is a unit that performs communication with the server device 10, and has a function as a reception unit for receiving signals and various data transmitted from the server device 10, and a function as a transmission unit for transmitting the signals and various data to the server device 10 in accordance with commands from the terminal control unit 21. The terminal communication unit 25 is realized, for example, by a network interface card (NIC) and the like.

Game Outline

An outline of the game provided by the game system 1 is described below.

The game system 1 according to the present embodiment is able to provide users (players) with a battle game that is played using a game medium. The following describes a battle card game that is played using a game card as one example of the game medium. Note that this game card serves as digital content, namely a virtual card used in a virtual space in the game.

Battle Card Game

The game system 1 according to the present embodiment is able to provide a battle card game that determines an outcome by allowing a character selected by a player to battle with an opposing character, i.e. an adversary.

In this battle card game, the player first selects a character to battle with the opposing character. In the present embodiment, the player is able to own a plurality of game cards (virtual cards used in a virtual space in the game). The game cards are each associated with a game character. Thus, when the player selects a game card to be used in the battle from the game cards that the player owns, the character associated with the selected game card is set as the character to battle with the opposing character (hereinafter referred to as a "player character").

Next, a battle game is started in which the player character selected by the user battles with the opposing character. In the present embodiment, the system is set such that, when a player finds an opposing character through a search, the opposing character appears as a battle adversary of the player character and the battle game starts. At this time, the player can start a battle with the opposing character that has appeared, by consuming a consumption parameter (battle energy) which is necessary for battling with the opposing character.

When the battle with the opposing character that has appeared is started, the player inputs a command to perform an attack. Then, the player character attacks the opposing character in accordance with the input command, and the opposing character performs a counter-attack to resist the attack. The outcome in the battle game in the present embodiment is determined based on a life parameter (hit point parameter) which is set for each character. The battle game is programmed so that as the value of the life parameter (hit point parameter) is reduced in accordance with attacks by an adversary, either the character whose value reaches zero first or the character whose value remaining at the end of a battle time period is smaller is defeated.

Furthermore, the battle card game according to the present embodiment may be a multiplayer battle game in which a plurality of players participate. More specifically, an opposing character that is common to various players is set as an adversary. Each player individually battles with the common opposing character. A value of a life parameter of the common opposing character is reduced in accordance with an attack by each player character. When the common opposing character performs a counter-attack to resist the attack, a value of a hit point parameter of each player character is reduced in accordance with the counter-attack. When the value of the life parameter of the opposing character reaches zero first, or when the remaining value of the life parameter of the opposing character is smaller than the remaining value of the hit point parameter of each player character at the end of a battle time period, each player character wins the battle with the opposing character.

Recovery of Consumption Parameter

In the present battle card game, a player is able to start a battle with an opposing character that has appeared, through consumption of a consumption parameter which is necessary for battling with the opposing character. However, there are cases where the player cannot battle with the opposing character due to a shortage in the consumption parameter caused by repetitive battles. In such cases, the player needs to recover the consumption parameter to perform the battle. In the present embodiment, the player can recover the consumption parameter using a recovery item. Furthermore, the consumption parameter can be recovered with time without using any recovery item.

Reward

In the present battle card game, rewards are given to a player who satisfy a predetermined reward condition during a battle with an opposing character.

More specifically, when the outcome of the battle with the opposing character is determined and the player defeats the opposing character, rewards such as a game card and an item are given to the player. Therefore, by playing the present battle card game, the player can increase the number of game cards, items, etc. he/she owns.

In the case of the aforementioned multiplayer battle game, when the common opposing character is defeated, a reward is given to each player based on the battle content and the result of the battle. In the present embodiment, a special reward (e.g., rare game card and rare item) that is different from a normal reward is given to a player who has contributed to a victory in the multiplayer battle game, such as a player who has caused a larger amount of damage to the opposing character than any other players, a player who has secured the defeat of the opposing character (i.e., a player who has taken the life of the opposing character at the end), and the like. This encourages each player to actively participate in such a participatory battle game because the players try to earn a special reward by defeating the opposing character before other players do.

Notification to Other Players

In the present battle card game, when a predetermined notification condition is satisfied during a battle with an opposing character, other players are notified of participation information indicating that they can participate in the battle with the opposing character. This participation information may be text data, image data, audio data, or the like which indicates that other players can participate in the battle with the opposing character.

More specifically, when a player has caused the opposing character to appear, other players are notified that they can participate in the battle with the opposing character that has appeared by a mail or the like. Also, when the player is defeated in the battle with the opposing character, other players are notified that they can participate in the battle with the opposing character by a mail or the like. This makes a large number of players participate in the battle with the opposing character.

Data Structure

The various types of information used in the game system 1 of the present embodiment will be described with reference to FIGS. 4 to 9. FIG. 4 illustrates an example of a data structure of card information. FIG. 5 illustrates an example of a data structure of recovery item information. FIG. 6 illustrates an example of a data structure of user information. FIG. 7 illustrates an example of a data structure of owned card information. FIG. 8 illustrates an example of a data structure of owned recovery item information. FIG. 9 illustrates an example of a data structure of opposing character information. At least card information, recovery item information, user information, and opposing character information are stored in the data storage unit 12 in the server device 10 in the present embodiment.

Card Information

The card information includes: a card ID which is one example of identification information for identifying a game card; and various types of information related to the game card associated with the card ID. For example, as illustrated in FIG. 4, the card information includes the card ID, the name of the character associated with the game card, the level of the character, and various types of parameters such as attack power, defense power, and hit point. Thus, at the time of performing a battle process, when a game card to be used to battle with the opposing character is selected by a user (player), the card information (e.g., attack power and hit point) of the selected game card is reflected as a skill value set for the character corresponding to the selected game card. Thus, the outcome of the battle game is determined.

Recovery Item Information

The recovery item information includes: a recovery item ID which is one example of identification information for identifying a recovery item; and various types of information related to the recovery item associated with the recovery item ID. For example, as illustrated in FIG. 5, the recovery item information includes: the recovery item ID; the name of the recovery item associated with the recovery item ID; and various types of parameters such as the price and recovery value of the recovery item. Thus, when a recovery item is selected by a user, the recovery item information (e.g., recovery value) of the selected recovery item is reflected, and the consumption parameter which is set for the player is recovered.

User Information

The user information includes: a user ID which is one example of identification information for identifying a user; and various types of information related to the particular user associated with the user ID. For example, as illustrated in FIG. 6, the user information includes: the user ID; friend user IDs; virtual currency; battle energy; owned card information; owned recovery item information; accumulated damage; opposing-character appearance information; and the like.

Friend user IDs are information indicative of other users (players) who have been registered on a friend list of the user. That is to say, the larger the number of friend user IDs is, the larger the number of other users with whom the user have become friends is. The friend user IDs are updated when the user registers other users on the friend list, and when the user deletes other users who have already been registered from the friend list.

The virtual currency is information indicative of the amount of virtual currency owned by the user (player). The virtual currency is updated when the user earns or spends virtual currency. In the present embodiment, the user can purchase a recovery item by spending virtual currency.

The battle energy is one example of the consumption parameter, and is data consumed through a battle with an opposing character. In the present embodiment, the player can start the battle with the opposing character by consuming the battle energy (by reducing a value of the battle energy). Specifically, the system is set such that the player cannot battle with the opposing character when there is a shortage of battle energy.

The owned card information is information indicative of cards owned by the user (player). The owned card information includes: owned card IDs indicative of cards owned by the user; and various types of information related to the owned cards associated with the owned card IDs.

For example, as illustrated in FIG. 7, the owned card information includes: the owned card IDs; the levels of characters associated with game cards with the owned card IDs; various types of parameters such as attack power and defense power; acquisition dates and times when the user acquired the owned cards; and the like.

The levels are information indicative of the levels of the characters associated with the game cards with the owned card IDs. Various types of parameters such as attack power, defense power and hit point are data indicative of skill values set for the characters. These levels and various types of parameters such as attack power are changed and updated in accordance with the result of the battle card game. The acquisition dates and times are information indicative of the dates and times when the user acquired the owned cards.

The owned recovery item information is information indicative of recovery items owned by the user. The recovery items are items used to recover a parameter consumed through a battle. In the present embodiment, the battle energy set for a player can be recovered (the value of the battle energy can be increased) by the player using a recovery item that he/she owns. The owned recovery item information includes: owned recovery item IDs indicative of the recovery items owned by the user; and various types of information related to the owned recovery items associated with the owned recovery item IDs. For example, as illustrated in FIG. 8, the owned recovery item information includes: the owned recovery item IDs; the numbers of owned recovery items associated with the owned recovery item IDs; and recovery values.

The accumulated damage is data obtained by accumulating values of the life parameter of the opposing character that were reduced when attacks by the player damaged the opposing character. That is to say, the larger the value of the accumulated damage, the larger the amount of damage to the opposing character.

The opposing-character appearance information is flag information indicative of whether or not the player has caused the opposing character to appear. In the present embodiment, "TRUE" is set when the player has caused the opposing character to appear, and "FALSE" is set when the player has not caused the opposing character to appear.

Opposing Character Information

The opposing character information includes: an opposing character ID for identifying the opposing character; and various types of information related to the opposing character associated with the opposing character ID. For example, as illustrated in FIG. 9, the opposing character information includes: the opposing character name; the level of the opposing character; various types of parameters such as attack power, defense power and life (HP: hit point); and the appearance time period. Thus, while the battle game process is being performed, the opposing character information (e.g., attack power) is reflected as a skill value which is set for the opposing character. Thus, the outcome of the battle game is determined.

The appearance time period is the duration of time during which the opposing character is making an appearance. In other words, the appearance time period is a battle time period during which the player can battle with the opposing character. Therefore, a battle with the opposing character is limited to being performed within this appearance time period.

Screen Transitions

Figure 10:
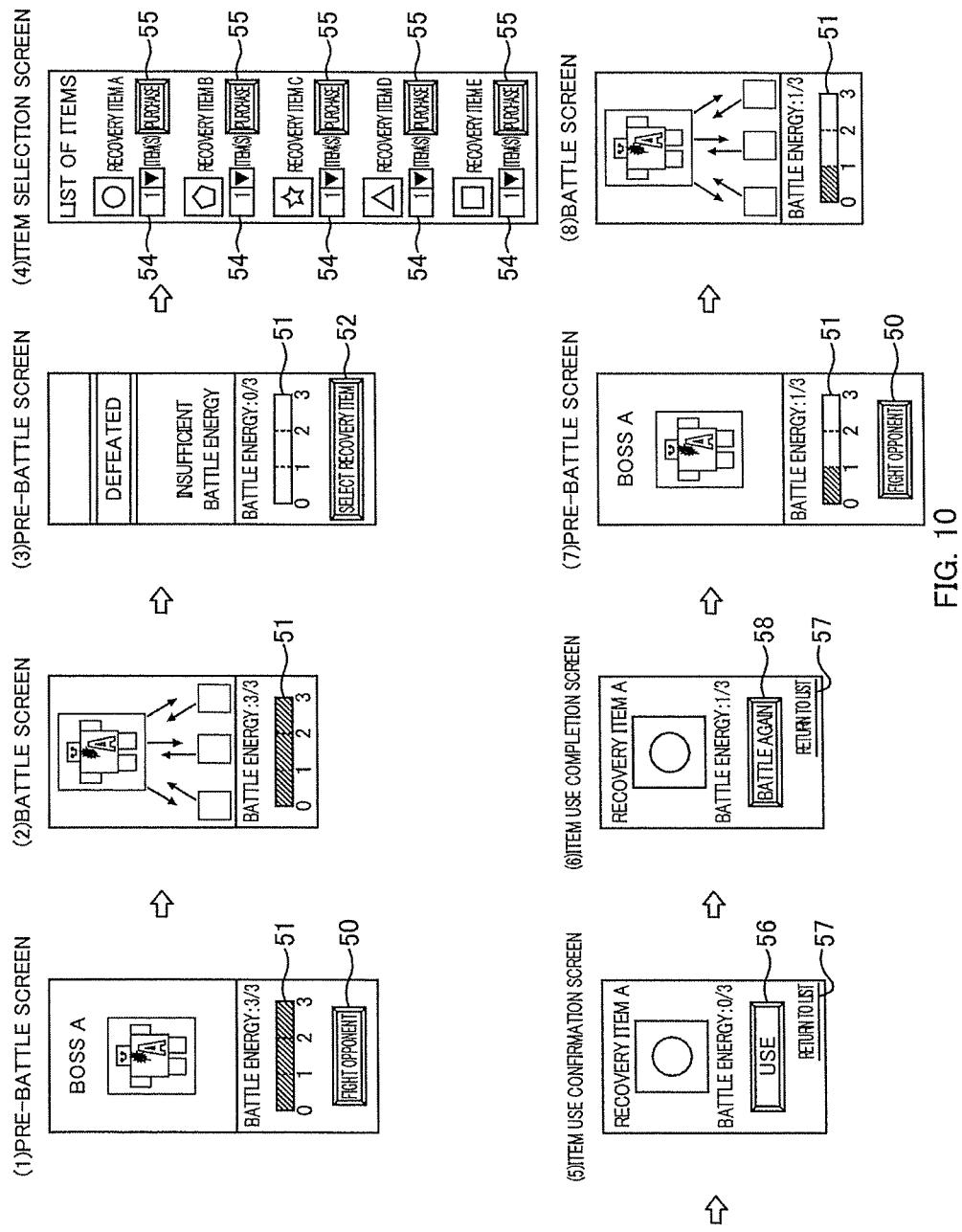
FIG. 10 illustrates screen transitions from the recovery of a consumption parameter to a battle with an opposing character in a comparative example.
Figure 11:
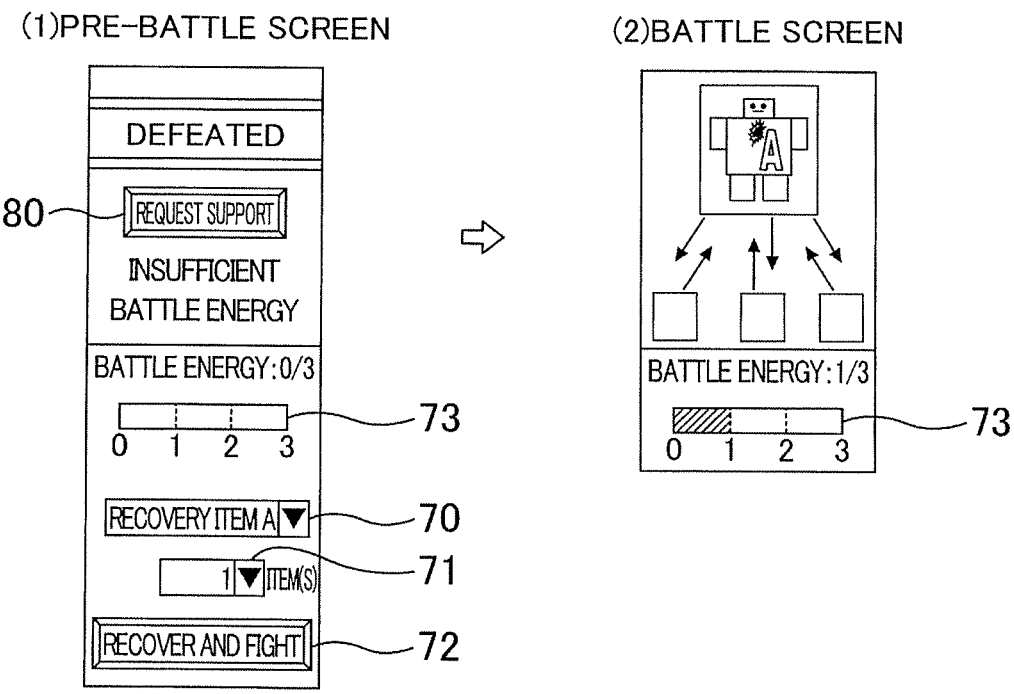
FIG. 11 illustrates screen transitions from the recovery of a consumption parameter to a battle with an opposing character in the present embodiment.

With reference to FIGS. 10 and 11, the following describes screen transitions from the recovery of a consumption parameter to a battle with an opposing character. FIG. 10 illustrates screen transitions in a comparative example from the recovery of a consumption parameter to a battle with an opposing character. FIG. 11 illustrates screen transitions in the present embodiment from the recovery of a consumption parameter to a battle with an opposing character.

Below, the screen transitions of a battle card game according to the present embodiment are described after the description of the comparative example.

Screen Transitions in Comparative Example

First, the screen transitions in the comparative example is described with reference to FIG. 10.

A player searches for an opposing character using a user terminal 20. When the server device 10 judges that the player has encountered the opposing character, i.e. an adversary (the opposing character has appeared), the server device 10 generates a game image indicative of the appearance of the opposing character and transmits the generated game image to the user terminal 20. It is assumed here that "boss A" is selected as the opposing character that has appeared, from among a plurality of opposing characters registered in the opposing character information (see FIG. 9).

Upon receiving such a game image, the user terminal 20 displays on the terminal display unit 24 "(1) pre-battle screen" illustrated in FIG. 10. This "(1) pre-battle screen" includes: the name and image of "boss A" that has appeared; a battle energy 51 that is consumed through a battle; and a battle button 50 for attacking the opposing character.

When the player selects the battle button 50, the user terminal 20 transmits to the server device 10 a battle request for battling with "boss A". Upon receiving the battle request, the server device 10 performs a battle process against "boss A" by causing consumption of the battle energy 51 of the player. That is to say, the server device 10 receives the battle request, and thereby receives a selection input (battle request) from the player into the reception unit 111 (reception process). Then, the server device 10 causes the battle processing unit 112 to perform the battle process against "boss A" through consumption of the battle energy 51. Thus, an outcome of the battle with boss A is determined.

After the outcome has been determined, the server device 10 causes the image generation unit 113 to generate a performance image showing the ongoing battle with "boss A", and transmits the generated performance image to the user terminal 20 over the network. Upon receiving such a performance image, the user terminal 20 causes the terminal display unit 24 to display "(2) battle screen" illustrated in FIG. 10. By thus displaying this "(2) battle screen" (performance image) before displaying the battle outcome, the player can enjoy the status of the battle with "boss A".

When the server device 10 repeatedly receives a selection input (battle request) from the player through the reception unit 111, the server device 10 can perform the battle process against "boss A" until the battle energy 51 is consumed completely (until the battle energy 51 reaches zero). In the present example, each time the player battles with "boss A" (each time the player presses the battle button 50), one point is consumed out of the three-point battle energy. When the battle energy 51 is consumed completely through the battle with "boss A", the server device 10 causes the image generation unit 113 to generate a game image indicating that the battle energy 51 is consumed completely, and transmits the generated game image to the user terminal 20.

Upon receiving such a game image, the terminal display unit 24 in the user terminal 20 displays "(3) pre-battle screen" illustrated in FIG. 10. This "(3) pre-battle screen" includes: the result of the battle ("defeated"); the completely-consumed battle energy 51; and a selection button 52 for selecting a recovery item.

By looking at "(3) pre-battle screen", the player can check that the battle energy 51 has been consumed completely through the battle with "boss A". The player needs to recover the battle energy 51 in order to battle with "boss A" again.

When the player selects the selection button 52 while "(3) pre-battle screen" is displayed on the terminal display unit 24, the user terminal 20 transmits a selection request for selecting a recovery item to the server device 10. Upon receiving a selection input (selection request) from the player through the reception unit 111, the server device 10 causes the image generation unit 113 to generate a game image including a list of recovery items to be purchased by the player, and transmits the generated game image to the user terminal 20.

Upon receiving such a game image, the user terminal 20 causes the terminal display unit 24 to display "(4) item selection screen" illustrated in FIG. 10. This "(4) item selection screen" includes: the names and images of recovery items; menu buttons 54 for selecting the number; and purchase buttons 55.

While "(4) item selection screen" is displayed on the terminal display unit 24, the player selects a recovery item that the player wishes to purchase from the list of the items, selects a desired number from among selection items in a pull-down menu by operating a menu button 54, and selects a purchase button 55. It is assumed here that the player purchases "one" "recovery item A" by spending virtual currency. The "recovery item A" is defined as an item that can recover one point (recovery value) worth of battle energy.

When the player selects the purchase button 55, the user terminal 20 transmits to the server device 10 a purchase request for purchasing the recovery item desired by the player. Upon receiving the purchase request, the server device 10 refers to the user information (see FIG. 6) and the recovery item information (see FIG. 5), and the server device 10 judges whether or not the virtual currency owned by the player is equal to or larger than the price of the recovery item. When the server device 10 judges that the player can purchase the recovery item, it causes the image generation unit 113 to generate a game image including the recovery item selected by the player and transmits the generated game image to the user terminal 20.

Upon receiving such a game image, the user terminal 20 causes the terminal display unit 24 to display "(5) item-use confirmation screen" illustrated in FIG. 10. This "(5) item-use confirmation screen" includes: the name and image of the purchased recovery item; a use button 56 for using the recovery item; and a return button 57 for returning to the list of the items.

The player checks the recovery item displayed on "(5) item-use confirmation screen", and selects the use button 56 when using the displayed recovery item. When the player does not use the displayed recovery item, the player can select the return button 57, return to the list of the items, and select another recovery item.

When the player selects the use button 56, the user terminal 20 transmits to the server device 10 a use request for using the recovery item. Upon receiving the use request, the server device 10 refers to the recovery item information (see FIG. 5) and recovers the battle energy in accordance with the recovery value of the purchased recovery item. The server device 10 then causes the image generation unit 113 to generate a game image indicating that the use of the recovery item has been completed, and transmits the generated game image to the user terminal 20.

Upon receiving such a game image, the terminal display unit 24 in the user terminal 20 displays "(6) item use completion screen" illustrated in FIG. 10. This "(6) item use completion screen" includes: the name and image of the recovery item the use of which has been completed; information indicating that the battle energy has been recovered; a re-battle button 58 for battling with "boss A" again; and the return button 57 for returning to the list of the items. In the present example, since "one" "recovery item A" has been used (purchased) through selection by the player, the battle energy has recovered from "0/3" to "1/3".

When the player selects the re-battle button 58, the user terminal 20 transmits to the server device 10 a re-battle request for battling with "boss A". Upon receiving the re-battle request, the server device 10 causes the image generation unit 113 to generate a game image that precedes the start of the battle. Then, the server device 10 transmits the generated game image to the user terminal 20.

Upon receiving such a game image, the terminal display unit 24 in the user terminal 20 displays "(7) pre-battle screen" illustrated in FIG. 10. This "(7) pre-battle screen" includes: the name and image of "boss A", i.e. an adversary; the recovered battle energy 51; and the battle button 50 for attacking the opposing character.

When the player selects the battle button 50, the user terminal 20 transmits to the server device 10 a battle request for battling with "boss A". Upon receiving the battle request, the server device 10 performs a battle process against "boss A" by causing consumption of the battle energy 51 of the player, and determines an outcome.

After the outcome has been determined, the server device 10 causes the image generation unit 113 to generate a performance image showing the ongoing battle with "boss A", and transmits the generated performance image to the user terminal 20. Upon receiving such a performance image, the user terminal 20 causes the terminal display unit 24 to display "(8) battle screen" illustrated in FIG. 10. By thus displaying this "(8) battle screen" (performance image) before displaying the battle outcome, the player can enjoy the status of the battle with "boss A".

As has been described above, in the comparative example, the screen transitions from the recovery of the consumption parameter to the battle with the opposing character are made up of six steps, namely "(3) pre-battle screen" through "(8) battle screen" illustrated in FIG. 10. That is to say, in order to battle with the opposing character (boss A) after recovering the consumption parameter (battle energy), the player not only needs to cause the terminal display unit 24 to display these six screens in sequence using the user terminal 20, but also needs to perform at least the following two operations: an operational input for using a recovery item through selection of the selection button 52, and an operational input for attacking the opposing character through selection of the battle button 50. Therefore, the recovery of the consumption parameter (battle energy) is troublesome, which requires a long period of time until the battle with the opposing character (boss A).

Screen Transitions in Present Embodiment

Screen transitions in the present embodiment are described with reference to FIG. 11.

In the present embodiment, as with the comparative example, when the server device 10 receives from a user terminal 20 a battle request for battling with "boss A", the server device 10 performs a battle process against "boss A" by causing consumption of the battle energy of a player. When the server device 10 repeatedly receives a selection input (battle request) from the player through the reception unit 111, the server device 10 can perform the battle process against "boss A" until the battle energy is consumed completely (until the battle energy reaches zero). In the present embodiment, each time the player battles with "boss A" (each time the player presses the battle button 50), one point is consumed out of the three-point battle energy.

When the battle energy is consumed completely through the battle with "boss A", the server device 10 causes the image generation unit 113 to generate a game image indicating that the battle energy is consumed completely, and transmits the generated game image to the user terminal 20.

Upon receiving such a game image, the terminal display unit 24 in the user terminal 20 displays "(1) pre-battle screen" illustrated in FIG. 11. Unlike "(3) pre-battle screen" according to the comparative example (see FIG. 10), this "(1) pre-battle screen" includes: an item menu button 70 for selecting a recovery item; a number menu button 71; a collective input button 72 for inputting the recovery and the attack collectively; and a support request button 80.

In order to battle with "boss A", the player needs to recover a battle energy 73 that has been consumed completely. Therefore, the player selects a desired recovery item from among selection items in a pull-down menu by operating the item menu button 70, selects a desired number from among selection items in a pull-down menu by operating the number menu button 71, and selects the collective input button 72. It is assumed here that the player selects "one" "recovery item A". The "recovery item A" is defined as an item that can recover one point (recovery value) worth of battle energy.

When the player selects the collective input button 72 in the above manner, the user terminal 20 transmits a battle request to the server device 10, the battle request being for recovering the battle energy by the selected "recovery item A" and attacking boss A.

Upon receiving the selection input (battle request) from the player through the reception unit 111 (reception process), the server device 10 continuously performs a recovery process for recovering the battle energy 73 using "recovery item A" and an attack process for attacking boss A by causing consumption of the recovered battle energy 73. That is to say, the battle processing unit 112 performs a process for determining an outcome of the battle with "boss A" by collectively performing the recovery process and the attack process.

As set forth above, in the battle process, upon receiving a single operational input from the player, the recovery process for recovering the battle energy and the attack process for attacking "boss A" are collectively performed (in a single operation, the recovery process and the attack process are performed continuously). In this way, the player can perform the recovery and the attack through a single operation. This simplifies the operation and allows quick attacking of "boss A".

After the outcome has been determined, the server device 10 causes the image generation unit 113 to generate a performance image showing the ongoing battle with "boss A", and transmits the generated performance image to the user terminal 20. Upon receiving such a performance image, the user terminal 20 causes the terminal display unit 24 to display "(2) battle screen" illustrated in FIG. 11. By thus displaying this "(2) battle screen" (performance image) before displaying the battle outcome, the player can enjoy the status of the battle with "boss A".

While "(1) pre-battle screen" is displayed on the terminal display unit 24, the player can select the support request button 80 to let other players participate in the battle with "boss A".

When the player selects the support request button 80, the user terminal 20 transmits a support request to the server device 10. Upon receiving the support request, the server device 10 to other players transmits participation information indicating that other players can participate in the battle with "boss A". This support request is made by mailing the participation information to the mail addresses of other players. Note that other players may be friend users of the player battling with "boss A", or may be other players selected by random selection.

As has been described above, in the present embodiment, unlike the comparative example, the screen transitions from the recovery of the consumption parameter to the battle with the opposing character are made up of two steps, namely "(1) pre-battle screen" and "(2) battle screen" illustrated in FIG. 11. That is to say, in order to battle with the opposing character (boss A) after recovering the consumption parameter (battle energy), the player only needs to display two screens in sequence on the terminal display unit 24 of the user terminal 20, which are smaller in number than the six screens displayed in the comparative example. Furthermore, a single operation (selecting the collective input button 72) enables the player to perform the following two operational inputs: an operational input for using a recovery item; and an operational input for attacking the opposing character. Therefore, it is possible to simplify recovery of the consumption parameter (battle energy) and to reduce a time period required until the battle with the opposing character (boss A).

Operation of Game System 1

Figure 12:
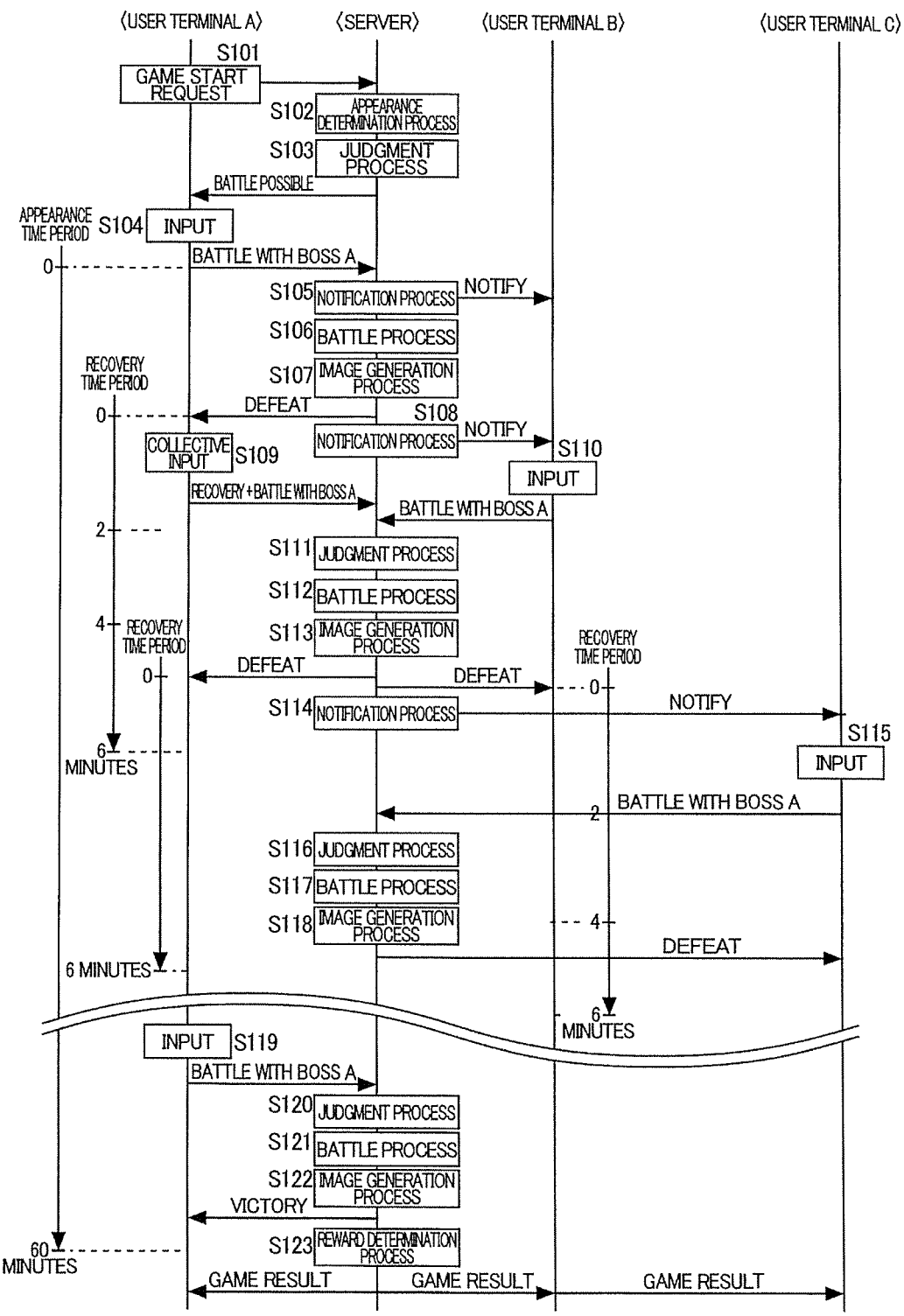
FIG. 12 is a flowchart describing an operation example of the game system 1 according to the present embodiment.

The following describes an overall operation of the game system 1 with reference to FIG. 12. FIG. 12 is a flowchart describing an operation example of the game system 1 according to the present embodiment. Note that in the game system 1 according to the present embodiment, the units are controlled and the processes are performed by causing the server device 10 and the user terminals 20 to cooperate based on a game program.

In the following description, it is assumed that a user terminal 20 used by a player A (first player) is a user terminal A, a user terminal 20 used by a player B (second player) is a user terminal B, and a user terminal 20 used by a player C (third player) is a user terminal C.

It is also assumed that players A and B are friend users, players B and C are friend users, and players A and C are not friend users.

First, the player A issues a start request for starting a battle card game by operating the user terminal A (S101). Specifically, a web page accessed by the player A for starting the battle game is displayed on the terminal display unit 24 of the user terminal A and the battle card game is started by the player A operating the terminal input unit 23. That is to say, when the terminal control unit 21 receives from the terminal input unit 23 an operational input signal to start the battle, the terminal control unit 21 associates the user ID with a command (game start request) to start the battle game and transmits the command to the server device 10 through the terminal communication unit 25.

The player A at this time can select a game card, in other words, can select a character associated with the game card to be used in the battle game. The character selected by the player becomes the player character to battle with the opposing character in the virtual space in the game. Therefore, when the character is selected by the user operating the terminal input unit 23, the terminal control unit 21 reads from the terminal storage unit 22 the card ID of the game card corresponding to the selected character. Then, the terminal control unit 21 transmits the read card ID and the user ID to the server device 10 through the terminal communication unit 25.

Next, when the server device 10 receives the game start request with the associated user ID, the server device 10 performs an appearance determination process for determining whether or not to cause the opposing character, i.e. an adversary against the player A, to appear (S102). Specifically, the control unit 11 determines by random selection either of the following states: whether to "cause the opposing character to appear" because the player A has encountered the opposing character as a result of the player A conducting a search, or to "cause the opposing character not to appear" because the player A has not encountered the opposing character. When the control unit 11 has determined to "cause the opposing character to appear", the control unit 11 selects one of the plurality of opposing characters registered in the opposing character information illustrated in FIG. 9 as an adversary against the player A. In the present embodiment, it is assumed that the control unit 11 has determined to "cause the opposing character to appear" and "boss A" is selected as the opposing character.

Note that, since the player A has caused the opposing character to appear, the opposing-character appearance information associated with the user ID of the player A is set to "TRUE" (see FIG. 6). Accordingly, in the reward determination process to be mentioned below, this opposing-character appearance information is referred, and a special reward (e.g., rare card and rare item) is given to the player A as a reward to a player who has caused the opposing character to appear.

Subsequently, the control unit 11 performs a judgment process for judging whether or not the player A can battle with the opposing character that has appeared (S103). Specifically, looking up the user information illustrated in FIG. 6, the control unit 11 judges whether or not the battle energy associated with the user ID (player A) included in the game start request is equal to or larger than a predetermined value. In the present embodiment, when the control unit 11 judges that the battle energy is equal to or larger than one point, it is judged that the player A can battle with the opposing character. On the other hand, when the control unit 11 judges that the battle energy of the player A is less than one point, it is judged that the player A cannot battle with the opposing character due to a shortage of battle energy. The following description is given under the assumption that the control unit 11 judges that the player A can battle with the opposing character ("boss A").

Thereafter, the control unit 11 causes the image generation unit 113 to generate a game image (e.g., "(1) pre-battle screen" illustrated in FIG. 10) indicating that the opposing character which has appeared is "boss A" and indicating that the player can battle with "boss A". The control unit 11 then transmits the game image generated by the image generation unit 113, to the user terminal A that has issued the request through the communication unit 15.

Upon receiving the game image transmitted from the server device 10, the terminal display unit 24 in the user terminal A displays the received game image and the user terminal A receives an operational input from the player A (S104). Since this game image includes an operating button (e.g., the battle button 50 on "(1) pre-battle screen" illustrated in FIG. 10) for battling with "boss A", the player A can select a battle with "boss A" by operating the terminal input unit 23.

When the player A selects the battle with "boss A", the terminal control unit 21 receives an input signal to select the battle with "boss A" from the terminal input unit 23, associates the user ID with a command (battle request) to battle with "boss A", and transmits the command to the server device 10 through the terminal communication unit 25.

Subsequently, when the server device 10 receives the operational input from the player A through the reception unit 111 by receiving the battle request for battling with "boss A", the server device 10 sets an appearance time period of the opposing character. Also, the server device 10 causes the notification unit 115 to perform a notification process (S105), and causes the battle processing unit 112 to perform a battle process (S106).

Upon receiving the operational input from the player A (reception process), the control unit 11 sets the appearance time period in order to limit a time period of the battle with "boss A". Specifically, by looking up the opposing character information illustrated in FIG. 9, the control unit 11 sets a timer for the appearance time period (60 minutes) which is set for "boss A". When the operational input is received from the player A within the appearance time period, the control unit 11 judges that the player A can battle with "boss A". On the other hand, when the operational input is received from the player A after the appearance time period has elapsed, the control unit 11 judges that the player A cannot battle with "boss A".

Upon receiving the operational input from the player A (reception process), the notification unit 115 performs a notification process for notifying other players of the participation information which indicates that the other players can participate in the battle with the opposing character (S105). In the present embodiment, the participation information is notified to the player B who is a friend user of the player A, but is not notified to the player C who is not a friend user of the player A. In this way, the number of players who participate in the battle with "boss A" can be restricted to a certain extent. Specifically, the notification unit 115 identifies a friend user (player B) based on the friend user IDs associated with the player A by looking up the user information (see FIG. 6). The notification unit 115 then generates a mail including the participation information indicating that the friend user (player B) can participate in the battle with "boss A", and distributes the generated mail to the mail address (included in the user information) of the friend user (player B).

Upon receiving the operational input from the player A, the battle processing unit 112 performs a battle process in which the battle energy that is set for the player A is consumed and in which an outcome of the battle with "boss A" is determined (S106).

Specifically, the battle processing unit 112 acquires the battle energy value (points) of the player A by looking up the user information illustrated in FIG. 6, subtracts points necessary for the battle from the acquired battle energy value, and writes the battle energy value obtained as a result of the subtraction back to the user information. In the present embodiment, provided that the acquired battle energy of the player A is three points, the battle process against "boss A" is performed by subtracting (consuming) one point from three points.

On the basis of the owned card information illustrated in FIG. 7, the battle processing unit 112 obtains the following parameters which are set for the player character (game card) selected by the player A: level; attack power; defense power; hit point; and the like. Also, on the basis of the opposing character information illustrated in FIG. 9, the battle processing unit 112 obtains the following parameters which are set for "boss A": level; attack power; defense power; life (HP); and the like. On the basis of the parameters such as level, attack power, defense power and the like set for the player character, the battle processing unit 112 calculates the amount of damage which the player character causes to "boss A", and then reduces the life parameter set for "boss A" in accordance with the damage.

Note that the battle processing unit 112 accumulates damage values that are reduced as a result of causing damage to "boss A" (values subtracted from the life parameter) and records them as an accumulated damage value in the user information (see FIG. 6). In this way, in the reward determination process to be described below, the accumulated damage value is looked up and a special reward (e.g., rare card and rare item) is given to a player who has caused the largest amount of damage to "boss A".

Similarly, on the basis of the parameters such as level, attack power, defense power and the like set for "boss A", the battle processing unit 112 calculates the amount of damage which "boss A" causes to the player character, and then reduces the hit point parameter set for the player character in accordance with the damage.

Each time the player A battles with "boss A" (each time the player A presses an operating button (the battle button 50 or the collective input button 72)), the battle processing unit 112 repeats the above calculation. When the battle processing unit 112 assesses that the life parameter has reached zero first, it determines that "boss A" is defeated (the player character has won). When the battle processing unit 112 assesses that the hit point parameter has reached zero first, it determines that the player character is defeated ("boss A" has won).

When the outcome of the battle with "boss A" has been determined by the battle processing unit 112, the server device 10 causes the image generation unit 113 to generate a game image in accordance with the result of the battle (S107).

The following describes the case where the battle energy of the player A is consumed completely through the battle with "boss A" and the player A is defeated in the battle with "boss A". In this case, the image generation unit 113 generates a game image indicating that the player A is defeated in the battle with "boss A" and that the battle energy thereof is consumed completely.

That is to say, the battle energy of the player A is less than the predetermined value (the battle energy is zero). Therefore, the control unit 11 looks up the owned recovery item information illustrated in FIG. 8 and judges whether or not the player A owns any recovery item. When the control unit 11 judges that the player A does not own any recovery item, the control unit 11 causes the image generation unit 113 to generate the game image of "(3) pre-battle screen" illustrated in FIG. 10. On the other hand, when the control unit 11 judges that the player A owns recovery items, it causes the image generation unit 113 to generate the game image of "(1) pre-battle screen" illustrated in FIG. 11. Since this game image includes the collective input button 72, the player A can perform the following two actions through a single operation by selecting the collective input button 72: the recovery of the battle energy using a recovery item; and the attack against "boss A". Therefore, it is possible to simplify recovery of the battle energy and to reduce a time period required until the battle with "boss A".

The control unit 11 then transmits to the user terminal 20 through the communication unit 15 the game image generated by the image generation unit 113. In the user terminal A, the terminal display unit 24 displays the received game image. By looking at the game image displayed on the terminal display unit 24, the player A can recognize that the battle energy is consumed completely. Also, the player A can recognize that it is necessary to recover the battle energy to battle with "boss A" again.

At this time, the server device 10 sets a recovery time period for recovering the battle energy of the player A. Specifically, the control unit 11 (battle processing unit 112) performs a process for recovering the battle energy with time as illustrated in FIG. 12. In the present embodiment, the battle energy is automatically recovered by one point every two minutes. That is to say, when six minutes have elapsed, the battle energy is automatically recovered by three points. Note that the battle energy of at least one point is required to battle with "boss A". Therefore, when the battle energy is zero, the player A is forced to lose at least two minutes.

However, without waiting for the lapse of time, the player A can immediately recover the battle energy by using a recovery item. For example, as illustrated in FIG. 12, when the player A selects the collective input button 72 before the lapse of the minimum recovery time period (two minutes) (S109), the user terminal A transmits to the server device 10 a battle request for recovering the battle energy and attacking boss A. In this case, the server device 10 can immediately recover the battle energy of the player A even when the minimum recovery time period (two minutes) has not elapsed yet. Furthermore, by performing the collective input, the player can recover the battle energy in a simplified manner and can reduce a time period required until the battle with "boss A". In this way, the player can promptly attack "boss A".

As set forth above, through the control unit 11 (battle processing unit 112), the server device 10 according to the present embodiment can selectively perform the following processes: a process for recovering the battle energy using a recovery item that increases the value of the battle energy; and a process for increasing the value of the battle energy with time regardless of the use of a recovery item. In the former recovery process, when the player performs the collective input, the battle energy can be recovered promptly. This enables the player to quickly attack "boss A".

When the player A is defeated in the battle with "boss A", the notification unit 115 performs a notification process for notifying other players of the participation information which indicates that other players can participate in the battle with "boss A" whom the player A has caused to appear (S108). In the present embodiment, the participation information is notified to the player B who is a friend user of the player A, but is not notified to the player C who is not a friend user of the player A. Therefore, the player B can participate in the battle with "boss A" whom the player A could not defeat. If the player B defeats "boss A", then the player B can earn a special reward. At this time, "boss A" has been damaged through the battle with the player A, and therefore can easily be defeated compared to the case where the player A was battling with "boss A". Thus, if the player B participates in the battle, then there is a higher chance that "boss A" will be defeated than when the player A was battling with "boss A". This increases the motivation for participating in the battle with "boss A", thereby making a larger number of players participate in the battle with "boss A".

Meanwhile, although the player A has been defeated by "boss A", the player A can battle with "boss A" again by recovering the battle energy. However, when the recovery of the battle energy is delayed (when there is a shortage of battle energy), the player A cannot battle with "boss A" immediately. Therefore, there is a possibility that the player B who participates in the battle later defeat "boss A" first. For this reason, in order to earn a special reward, the player A needs to immediately recover the battle energy and battle with "boss A". In view of this, by selecting the collective input button 72 (S109), the player A can perform through a single operation the recovery of the battle energy using a recovery item and the attack against "boss A". In this way, even when the player B has participated in the battle through the notification, a time period from the recovery of the battle energy to the battle with "boss A" can be reduced, and therefore the battle with "boss A" can be performed promptly to earn a special reward.

The following describes the case where the player B receives the participation information notified in relation to the battle between the player A and "boss A" whom the player A has caused to appear and the player B participates in the battle with "boss A". The player B can participate in the battle with "boss A" within the appearance time period. As mentioned above, allowing other players to participate in the battle within a limited time period makes a larger number of players actively participate in the battle.

A web page accessed by the player B for starting the battle with "boss A" is displayed on the terminal display unit 24 of the user terminal B and the battle game is started by the player B operating the terminal input unit 23. Specifically, when the terminal control unit 21 receives an input signal from the terminal input unit 23, the terminal control unit 21 associates the user ID with a command (battle request) to battle with "boss A" and transmits the command to the server device 10 through the terminal communication unit 25 (S110).

When the server device 10 receives an operational input (second operational input) from the player B through the reception unit 111 by receiving the battle request for battling with "boss A", the server device 10 performs a judgment process for judging whether or not the player B can battle with "boss A" (S111). Specifically, the control unit 11 looks up the user information illustrated in FIG. 6 and judges whether or not the battle energy associated with the player B is equal to or larger than a predetermined value. In the present embodiment, when the control unit 11 judges that the battle energy is equal to or larger than one point, it is judged that the player B can battle with the opposing character. On the other hand, when the control unit 11 judges that the battle energy of the player B is less than one point, it is judged that the player B cannot battle with the opposing character due to a shortage of battle energy. The following description is given under the assumption that the control unit 11 judges that the player B can battle with "boss A".

Upon receiving the operational input from the player B, the battle processing unit 112 performs a battle process in which the battle energy that is set for the player B is consumed and in which an outcome of the battle with "boss A" is determined (S112).

When the outcome of the battle with "boss A" has been determined by the battle processing unit 112, the server device 10 causes the image generation unit 113 to generate a game image in accordance with the result of the battle (S113).

It is assumed here that the battle energy of the player B is consumed completely through the battle with "boss A" and the player B is defeated in the battle with "boss A". In this case, the image generation unit 113 generates a game image indicating that the player B is defeated in the battle with "boss A" and that the battle energy thereof is consumed completely.

At this time, the server device 10 sets a recovery time period for recovering the battle energy of the player B. Specifically, the control unit 11 (battle processing unit 112) performs a process for recovering the battle energy with time as illustrated in FIG. 12. In the present embodiment, the battle energy is automatically recovered by one point every two minutes.

Since the player B is defeated in the battle with "boss A", the notification unit 115 performs a notification process for notifying other players of the participation information which indicates that other players can participate in the battle with "boss A" whom the player A has caused to appear (S114). In the present embodiment, the participation information is notified to the player C who is a friend user of the player B. Consequently, it is possible for the player C to participate in the battle with "boss A" whom the player A has caused to appear; the player C is not a friend user of the player A, but the player B who is a friend user of the player A notified the player C of the participation information. This allows the players who participate in the battle with "boss A" to be limited to a group of users who maintain a certain level of relationship with one another. Although the player A is a friend user of the player B, the participation information is not notified to the player A. This is because the player A has already participated in the battle with "boss A" whom the player A has caused to appear. As a result, the player C can participate in the battle with "boss A" whom neither the player A nor the player B could defeat. If the player C defeats "boss A", then the player C can earn a special reward.

By thus notifying the participation information to friend users in sequence, each player can enjoy the multiplayer battle game in cooperation with or in competition with a larger number of players; in the multiplayer battle game, each player battles with an opposing character (boss A) who is common to a plurality of players.

Similarly, when the player C receives the participation information notified as a result of the battle between the player B and "boss A" whom the player A has caused to appear, the player C can participate in the battle with "boss A" using the user terminal C. The player C can participate in the battle with "boss A" within the appearance time period set for "boss A". In this manner, a larger number of players (the player C) actively participate in the battle within a limited time period. Even if other players who are not friend users of the player A participate in the battle, the number of such players can be limited because the appearance time period is limited. Furthermore, since other players who maintain a certain level of relationship with the player A participate in the battle, only a group of limited users can enjoy the battle game.

When the player C performs an operational input for attacking "boss A" (third operational input), the user terminal C transmits a battle request to the server device 10 (S115). The server device 10 receives the battle request, and thereby the control unit 11 receives the operational input from the player C. Based on the battle energy of the player C, the control unit 11 then judges that the player C can battle with "boss A" (S116). When "boss A" defeats the player C and the battle processing unit 112 thereby determines that "boss A" has won (S117), the image generation unit 113 generates a game image indicating that the player C is defeated (S118).

At this time, the notification unit 115 performs a notification process for notifying the participation information to other players because the player C is defeated in the battle with "boss A". In the present embodiment, the participation information is further notified to friend users of the player C (excluding the player B).

When the user terminal C receives the game image transmitted from the server device 10, it causes the terminal display unit 24 to display the game image. In this way, the player C can check that he/she has been defeated by "boss A".

Finally, when the player A performs an operational input for attacking "boss A", the user terminal A transmits a battle request to the server device 10 (S119). The control unit 11 receives the operational input from the player A by the server device 10 receiving the battle request. The control unit 11 then judges that the player A can battle with "boss A", based on the battle energy of the player A (S120). When the battle processing unit 112 determines that the player A defeats "boss A" and has won (S121), the image generation unit 113 generates a game image indicating that the player A has won (S122).

When the user terminal A receives the game image transmitted from the server device 10, the terminal display unit 24 displays the game image. In this way, the player A can check that he/she has defeated "boss A".

Next, the server device 10 performs a reward determination process for determining a reward to be given to each player who has participated in the battle with "boss A" (S123). A player who has contributed to a victory in the battle with "boss A" is given a special reward that is different from a normal reward that is equally given to each player. Specifically, the reward unit 114 looks up the opposing-character appearance information (TRUE) registered in the user information illustrated in FIG. 6, identifies the player who has caused the opposing character to appear, and gives to the identified player a special reward (e.g., rare card and rare item). In addition, the reward unit 114 looks up the accumulated damage values registered in the user information illustrated in FIG. 6, identifies the player who has caused the largest amount of damage to "boss A", and gives a special reward to the identified player. Furthermore, when the defeat of "boss A" has been determined, the reward unit 114 identifies, out of a plurality of players, the player who has secured the defeat of "boss A", based on changes in the life parameter (hit point parameter) of "boss A". The reward unit 114 gives a special reward to the identified player.

When the rewards have been determined by the reward unit 114, the server device 10 distributes to the user terminals A to C game result information including the record of the battle and the like.

As has been described above, in the game system 1 according to the present embodiment, the input for using a recovery item and the input for attacking "boss A" can be performed through a single operation. Therefore, it is possible to simplify recovery of the consumption parameter (battle energy) and to reduce a time period required until a battle with an opposing character (boss A).

Furthermore, by notifying the participation information in sequence from one player to his/her friend user, and then from that friend user to his/her friend user, each player can enjoy the battle game in cooperation with or in competition with a larger number of players; in the battle game, each player battles with an opposing character (boss A) whom is common to a plurality of players. Moreover, since it is possible to limit participating players to a group of users who maintain a certain level of relationship with one another, each player can enjoy the battle game while actively communicating with one another.

Other Embodiments

The present embodiment facilitates understanding of the present invention and does not intend to limit the interpretation of the present invention. Variations and modifications may be made in accordance with the spirit and scope of the present invention and equivalents thereof are included in the present invention. In particular, embodiments described below are to be included in the present invention.

Image Generation Unit

The present embodiment has described an example in which the image generation unit 113 generates a game image including the battle energy (e.g., "(2) battle screen" illustrated in FIG. 11). However, the present invention is not limited in this way. For example, the image generation unit 113 may generate a game image that further includes a life parameter of an opposing character. This enables a player to strategically play the battle game by operating the collective input button 72 while checking the status of the opposing character.

Notification Unit

The above embodiment has described an example in which the notification unit 115 notifies the players of the participation information. However, the present invention is not limited in this way. For example, the notification unit 115 may notify other players of the following information: the appearance time period of the opposing character; and the start time and the end time of the appearance of the opposing character. This allows other players to acknowledge the times in advance and thus makes it easy for the other players to participate in the battle with the opposing character. Accordingly, each player can enjoy the battle game in cooperation with or in competition with a larger number of players.

Consumption Parameter

The present embodiment has described the battle energy set for a player as one example of the consumption parameter. However, the present invention is not limited in this way. For example, the hit point parameter set for a player character may be used as the consumption parameter.

Battle Process

In the battle process according to the present embodiment, when attacking an opposing character after recovering the battle energy, damage caused to the opposing character (a decrease in the hit point parameter of the opposing character) may be changed in accordance with the value of the recovered battle energy. For example, the system may be set such that the amount of the opposing character's damage caused by a single attack is larger when the battle energy is recovered by three points than when the battle energy is recovered by one point. This allows strategically attacking of the opposing character, thereby making the battle enjoyable.

Server Device

The present embodiment has described the game system 1 including one server device 10 as an example. However, the present invention is not limited in this way. A plurality of server devices may be connected via a network, and each server device may execute various types of distributed processing.

Virtual Currency

In the present embodiment, the virtual currency may be given to each user periodically by a certain amount, or may be purchased by each user. Also, the virtual currency may be given to each user in accordance with communication performed between that user and other users.

What is claimed is:

1. An information processing device, comprising:
    a storage unit configured to store a friend list of each player;
    a battle processing unit configured to execute a multiplayer battle game in which a plurality of players participate, and
    to determine an outcome of a battle with an opposing character;
    a notification unit
    configured to notify a player of participation information indicating that the player can participate in the battle with the opposing character,
    to, in case the battle processing unit starts a battle between the opposing character and a first player, select from the friend list of the first player a second player to whom the participation information is to be notified,
    to, in case the battle processing unit determines that the second player who participated in the battle is defeated, select from the friend list of the second player a third player to whom the participation information is to be sequentially notified and who is not the first player; and
    a reward unit
    configured to give a normal reward to each of players who participated in the battle with the opposing character,
    to, in case the battle processing unit determines that the opposing character is defeated,
    give the normal reward to all players who participated in the battle with the opposing character, and
    give a special reward which is different from the normal reward, among the all players, to a player who has secured the defeat of the opposing character.

2. An information processing device according to claim 1, wherein
    in case the battle processing unit determines that the first player is defeated,
    the notification unit notifies the second player of the participation information, and
    the notification unit does not notify the third player of the participation information.

3. An information processing device according to claim 1, wherein
    the battle processing unit authorizes the second player and the third player to participate in the battle between the opposing character and the first player within a limited time period that is set in advance for the opposing character.

4. An information processing device according to claim 1, wherein
the battle processing unit starts the battle with the opposing character by causing consumption of a consumption parameter set for each player,
after the consumption parameter is consumed, the battle processing unit selectively executes one of:
a first recovery process in which the consumption parameter recovers using a recovery item set for each player, and
a second recovery process in which the consumption parameter recovers with time without using the recovery item.

5. A non-transitory computer-readable storage medium, with a game program stored thereon, the game program instructing a computer having a processor and a memory to perform the following processes:
a process in which a friend list of each player is recorded in a storage unit;
a battle process in which
a multiplayer battle game in which a plurality of players participate is executed, and
an outcome of a battle with an opposing character is determined;
a notification process
in which participation information is notified to a player, the participation information indicating that the player can participate in the battle with the opposing character, the notification process including:
a process in which, in case a battle between the opposing character and a first player starts in the battle process, a second player to whom the participation information is to be notified selected from the friend list of the first player; and
a process in which, in case it is determined in the battle process that the second player who participated in the battle is defeated, a third player to whom the participation information is to be sequentially notified and who is not the first player is selected from the friend list of the second player; and
a reward process in which a normal reward is given to each of the players who participated in the battle with the opposing character,
the reward process including:
a process in which, in case it is determined in the battle process that the opposing character is defeated,
all players who participated in the battle with the opposing character are given the normal reward, and
among the all players, a player who has secured the defeat of the opposing character is given a special reward which is different from the normal reward.

* * * * *